(12) United States Patent
Goodman

(10) Patent No.: US 10,730,203 B2
(45) Date of Patent: Aug. 4, 2020

(54) 3D PRINTING OF SILICON CARBIDE STRUCTURES

(71) Applicant: Goodman Technologies LLC, Albuquerque, NM (US)

(72) Inventor: William A. Goodman, Albuquerque, NM (US)

(73) Assignee: Goodman Technologies LLC, Albuquerque, NM (US)

(*) Notice: Subject to any disclaimer, the term of this patent is extended or adjusted under 35 U.S.C. 154(b) by 0 days.

(21) Appl. No.: 16/137,354

(22) Filed: Sep. 20, 2018

(65) Prior Publication Data

US 2019/0160704 A1 May 30, 2019

Related U.S. Application Data

(60) Provisional application No. 62/562,294, filed on Sep. 22, 2017, provisional application No. 62/576,322, (Continued)

(51) Int. Cl.
*B28B 1/00* (2006.01)
*B28B 11/24* (2006.01)
(Continued)

(52) U.S. Cl.
CPC ............ *B28B 1/001* (2013.01); *B28B 11/243* (2013.01); *B32B 18/00* (2013.01); *B33Y 10/00* (2014.12);
(Continued)

(58) Field of Classification Search
CPC ....... B28B 1/001; B28B 11/243; B33Y 10/00; B33Y 70/00; C04B 35/571; C04B 35/806
See application file for complete search history.

(56) References Cited

U.S. PATENT DOCUMENTS 5,071,596 A    12/1991   Goela et al.
5,853,653 A    12/1998   Donato et al.
(Continued)

FOREIGN PATENT DOCUMENTS

WO        9616000        5/1996

OTHER PUBLICATIONS

Ahmad, I. , et al., "Microwave-Assisted Pyrolysis of SiC and its Application to Joining", American Ceramic Society, Cincinnati, OH., May 1-3, 1995, 1995.
(Continued)

*Primary Examiner* — Mathieu D Vargot
(74) *Attorney, Agent, or Firm* — Peacock Law P.C.; Philip D. Askenazy

(57) ABSTRACT

A method of making a ceramic matrix composite (CMC) article by combining a preceramic polymer with one or more sized nanopowders and optional surfactants and/or solvents to form a mixture suitable for 3D printing, depositing the mixture on a mandrel, curing it to form a green body, and pyrolyzing the green body such that the nanocrystalline surface of the CMC article has sufficiently the same surface roughness and figure accuracy of the mandrel to enable the CMC article to be used without further polishing. The mixture can be a paste or slurry that is self supporting and exhibit pseudoplastic rheology. The preceramic polymer is preferably a precursor to SiC, and the nanopowders preferably comprise SiC. The article can be densified by using polymer infiltration pyrolysis, with or without nanoparticles. The curing and pyrolysis of the article can be performed with microwave radiation. An example structure is a gradient density lattice with a mirror surface for use in a cryogenically cooled infrared optical system such as an orbiting space telescope.

31 Claims, 5 Drawing Sheets

Related U.S. Application Data filed on Oct. 24, 2017, provisional application No. 62/581,170, filed on Nov. 3, 2017.

(51) Int. Cl.

| | |
|---|---|
| *B33Y 10/00* | (2015.01) |
| *B33Y 70/00* | (2020.01) |
| *C04B 35/571* | (2006.01) |
| *C04B 35/80* | (2006.01) |
| *C04B 35/63* | (2006.01) |
| *B32B 18/00* | (2006.01) |
| *C04B 37/00* | (2006.01) |
| *C04B 35/565* | (2006.01) |
| *C04B 35/573* | (2006.01) |
| *G02B 23/02* | (2006.01) |

(52) U.S. Cl.
CPC ............ *B33Y 70/00* (2014.12); *C04B 35/565* (2013.01); *C04B 35/571* (2013.01); *C04B 35/573* (2013.01); *C04B 35/6316* (2013.01); *C04B 35/806* (2013.01); *C04B 37/008* (2013.01); *C04B 2235/3826* (2013.01); *C04B 2235/404* (2013.01); *C04B 2235/422* (2013.01); *C04B 2235/425* (2013.01); *C04B 2235/483* (2013.01); *C04B 2235/5248* (2013.01); *C04B 2235/5276* (2013.01); *C04B 2235/5288* (2013.01); *C04B 2235/5454* (2013.01); *C04B 2235/6021* (2013.01); *C04B 2235/6026* (2013.01); *C04B 2235/616* (2013.01); *C04B 2235/656* (2013.01); *C04B 2235/667* (2013.01); *C04B 2235/762* (2013.01); *C04B 2237/365* (2013.01); *C04B 2237/38* (2013.01); *C04B 2237/586* (2013.01); *G02B 23/02* (2013.01)

(56) References Cited

U.S. PATENT DOCUMENTS

| | | |
|---|---|---|
| 7,888,277 B2 | 2/2011 | Riedell et al. |
| 8,337,648 B2 | 12/2012 | Mako et al. |
| 8,859,037 B2 | 10/2014 | Stout et al. |
| 9,943,979 B2 | 4/2018 | Findley |
| 9,944,021 B2 | 4/2018 | Easter et al. |
| 9,944,564 B2 | 4/2018 | Amini et al. |
| 2003/0137084 A1 | 7/2003 | Kohyama et al. |
| 2007/0138706 A1 | 6/2007 | Metzger et al. |
| 2007/0140065 A1* | 6/2007 | Levingston ............ B21F 35/04 368/127 |
| 2011/0221084 A1 | 9/2011 | Goodman et al. |
| 2017/0233300 A1 | 8/2017 | Raj |
| 2017/0369380 A1 | 12/2017 | Smyth et al. |
| 2018/0148588 A1 | 5/2018 | Schmidt et al. |

OTHER PUBLICATIONS

Danko, Gene A., et al., "Comparison of Microwave Hybrid and Conventional Heating of Preceramic Polymers to Form Silicon Carbide and Silicon Oxycarbide Ceramics", J. Am. Ceram. Soc., vol. 83, No. 7, 2000, 1617-1625.

Reed, James S., "Principles of Ceramics Processing, 2nd Edition", 1995, 265-272.

* cited by examiner

3D PRINTING OF SILICON CARBIDE STRUCTURES

CROSS-REFERENCE TO RELATED APPLICATIONS

This application claims the priority to and the benefit of the filing of U.S. Provisional Patent Ser. No. 62/562,294, filed on Sep. 22, 2017, entitled "3D Printing of Low Density Silicon Carbide Structures", U.S. Provisional Patent Ser. No. 62/576,322, filed on Oct. 24, 2017, entitled "Replicated Nanocomposite First Surface for 3D Printed and Additively Manufactured Silicon Carbide Mirrors", and U.S. Provisional Patent Ser. No. 62/581,170, filed on Nov. 3, 2017, entitled "Replicated Nanocomposite First Surface for 3D Printed and Additively Manufactured Silicon Carbide Mirrors". The specifications and claims thereof are incorporated herein by reference.

FEDERALLY SPONSORED RESEARCH OR DEVELOPMENT

The U.S. Government has a paid-up license in this invention and the right in limited circumstances to require the patent owner to license others on reasonable terms as provided for by the terms of SBIR I Contract # NNX17CM29P and Contract Nos. 80NSSC18P1995 and 80NSSC18P2058 awarded by the National Aeronautics and Space Administration (NASA).

BACKGROUND OF THE INVENTION

Field of the Invention (Technical Field)

The present invention is related to three-dimensional (3D) printing of ultralightweight, low density silicon carbide structures, and to replicated nanocomposite first surfaces for 3D printed and additively manufactured silicon carbide mirrors.

BACKGROUND ART

Note that the following discussion refers to a number of publications and references. Discussion of such publications herein is given for more complete background of the scientific principles and is not to be construed as an admission that such publications are prior art for patentability determination purposes.

SUMMARY OF THE INVENTION (DISCLOSURE OF THE INVENTION)

The present invention is a method of making a ceramic matrix composite (CMC) article, the method comprising combining a first preceramic polymer with a nanopowder to form a mixture; extruding the mixture through a nozzle; depositing the mixture on a mandrel; curing the mixture to form a green body; removing the green body from the mandrel; and pyrolyzing the green body to form a CMC article; wherein a surface of the CMC article has sufficiently the same surface roughness and figure accuracy of the mandrel to enable the CMC article to be used without polishing. The CMC article optionally forms a mirror, lens, edge ring, windshield, or hypersonic leading edge. The mixture preferably exhibits pseudoplastic rheology and is preferably a paste or slurry. The mixture is preferably self supporting and optionally comprises between approximately 0.5 wt % and 60 wt % nanopowder, or optionally comprises between approximately 60 wt % and 95 wt % nanopowder. The mixture preferably comprises only nanometer sized powders, and the surface of the CMC article is preferably nanocrystalline. The nanopowder optionally comprises particles having different powder sizes, preferably between about 15 nm and about 7 microns. The mixture optionally comprises one or more solvents, one or more surfactants, and/or a binder, wherein the one or more solvents preferably have a vapor pressure sufficiently low to prevent the mixture from cracking as it dries. The curing and pyrolyzing steps are preferably controllably performed to prevent cratering. The method optionally further comprises machining the green body prior to the pyrolyzing step. The method optionally further comprises joining the green body to a second green body by cementing the green body to the second green body using the first preceramic polymer or a different preceramic polymer comprising nanoparticles as a cement prior to the pyrolyzing step. The first preceramic polymer is preferably a precursor to SiC, and the nanopowders preferably comprise SiC. The pyrolyzing step is preferably performed from about 800° C. to about 1700° C., thereby producing a CMC article comprising beta-SiC.

The method preferably further comprises densifying the CMC article by using polymer infiltration pyrolysis, comprising the steps of infiltrating the CMC article with a second preceramic polymer comprising a first weight percentage of nanoparticles; pyrolyzing the CMC article; infiltrating the CMC article with the second preceramic polymer comprising a second weight percentage of nanoparticles the same or higher than the first weight percentage; and pyrolyzing the CMC article again. The second infiltrating step preferably is performed at a higher temperature than the temperature of the first infiltrating step. The second preceramic polymer is optionally the same as the first preceramic polymer. These steps are preferably repeated until the desired density of the CMC article is achieved. The mixture optionally comprises a material selected from the group consisting of carbon nanotubes, carbon fibers, graphene nanosheets, tungsten nanoparticles, piezoelectric materials, high-z materials, and magnetostrictive materials. The curing step preferably comprises microwaving the green body, illuminating the green body with infrared radiation, or heating the green body. The method optionally further comprises depositing the mixture on the green body; curing the deposited mixture and the green body to form a larger green body; and repeating the additional deposition and curing steps until a desired green body article, such as a lattice, is produced. The lattice optionally comprises a density gradient. The CMC article optionally changes shape when exposed to an electric or magnetic field. The mandrel preferably either has a coefficient of thermal expansion of about zero or has a coefficient of thermal expansion chosen so that the mandrel is the desired size at a cure temperature of the mixture. The pyrolyzing step optionally comprises microwaving the green body. The mixture is optionally partially cured during the depositing step. The method can be performed in orbit, space, or a microgravity environment. The CMC article is optionally used in a cryogenically cooled infrared optical system.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating certain embodiments of the invention and are not to be construed as limiting the invention. In the figures.

DETAILED DESCRIPTION OF EMBODIMENTS OF THE INVENTION

Figure 1:
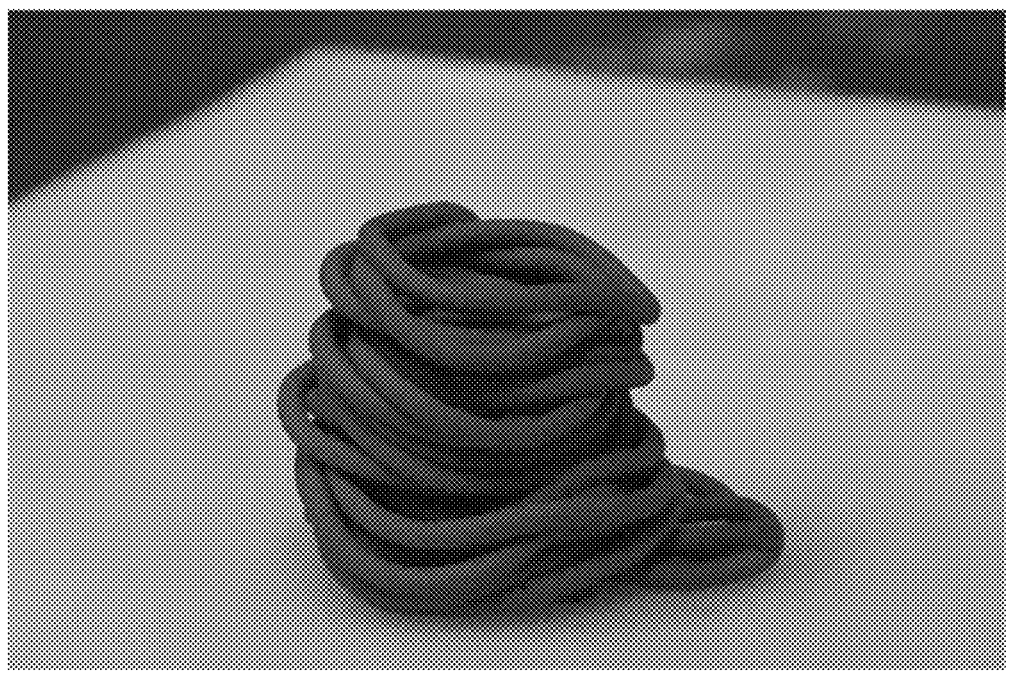
FIG. 1 is a photograph showing a self-supporting slurry of the present invention.

The present invention is a method for three-dimensional (3D) manufacture of silicon carbide structures, for example a scalable, variable density lattice structured coupon that is lightweight but sufficiently dense on at least one surface to enable polishing, or more preferably matching a polished surface on which it was deposited, thereby not requiring polishing. The coupon can be scaled to form a large area (1.5 m or greater) hexagonal telescope mirror. 3D printing of SiC enables the mirror to optionally be produced in space, thereby requiring less material since there is no need to be able to withstand gravitational and launch forces. These ultralightweight mirrors thus dramatically reduce launch costs, manufacturing schedule, and overall mission risk since the ultralightweight mirrors are presently long lead items requiring multiple, serial, handling and manufacturing steps (e.g., produce blank, machine blank, measure blank, lap blank, polish blank, measure optical figure, etc.).

The present invention is also suited for the 3D printing and additive manufacturing of high-purity silicon carbide components (e.g. edge rings) used in semiconductor manufacturing and processing equipment, printing silicon carbide large-scale (25 cm-multiple-meter) structures in the microgravity of space (e.g. mirrors, trusses, bulkheads, telescopes, deployable mechanisms), 3D printing and additive manufacturing of lightweight windshields for hypervelocity penetrators, 3D printing and additive manufacturing of multi-functional hollow-core structures for kill vehicle interceptor structures of missile payloads, and thermal protection systems for aeroshells, missiles, and hypersonic leading edges.

Embodiments of the present invention use a preceramic polymer comprising SiC powders to 3D print structures. It is preferable to use a plurality of powder sizes, mixed together within the preceramic polymer, to provide high solids-loading slurries (approximately 0.5-60 wt % of powder) or pastes (greater than approximately 60 wt % of powder), preferably comprising a pseudoplastic rheology. Multiple organic solvents and/or surfactants and organics with variable and differing vapor pressures may be used to optimize the rheology specific to each application cited earlier. High solids-loadings reduce the cracking, shrinking, or deforming of parts during the drying and densification process. Cracking can alternatively be eliminated using binder materials and flocculants. However, the polymer infiltration pyrolysis (PIP) process described below is able to "fill and repair" the cracks if cracking occurs. In one embodiment the resulting slurry was greater than 50 wt % solids (i.e. powder), and pastes with 92 wt % powder have been employed. An optimal mixture of the particle sizes, preferably ranging from nanoparticles to micron or submillimeter sized particles, enables interstitial voids between large particles to be filled with smaller particles, as described in James Reed's Principles of Ceramics Processing (1995). The slurry or paste may comprise a small amount of binder (e.g. PEG 1000) for green strength purposes, particularly when printing parts greater than approximately 60 mm wide and 4 mm in depth. In some embodiments (e.g. solid or minimally lightweighted structures), the lower vapor pressure components may selectively and/or successively be removed from 3D printable pastes to create a high solids-loadings paste or "nanopaste" that is moldable, but no longer printable. This removal of lower vapor pressure components may be achieved by low temperature (e.g. less than about 200° C.) heating in an oven, a vacuum furnace with inert gas backfill, a microwave oven on low power (e.g. less than about 500 W), or a reconfigured microwave oven outfitted with a vacuum system and backfillable with inert or reactive gases. The latter system is envisioned for use in the microgravity environment of space.

The preceramic polymer is preferably StarPCS™ SMP-10 from Starfire Systems, the only commercially available one-component liquid precursor to silicon carbide ceramic. This SiC precursor has never been used in 3D printing before. Pseudoplastic rheology allows sequential layers to be deposited during the additive manufacturing (AM) process without part deformation until sufficient drying/curing can occur, thereby locking in the structure. A solvent can be used to dilute the slurry to obtain the proper rheology for extrusion of the particulate paste through a prescribed diameter deposition nozzle tip. The solvent preferably has a sufficiently low vapor pressure so that the slurry does not dry so quickly as to create cracks. For example, the vapor pressure of toluene is 3.8 kPa. Within 10 to 15 seconds of being deposited, the slurry preferably dries from a fluidlike state into a solidlike state so that the next layer can be added. If the slurry is too fluid, the deposits will come out as liquid beads that spread uncontrollably. If it is too thick, the deposits are like rope. With the proper consistency, each deposited bead preferably comprises a cylindrical shape which preferably flattens out into a rectangular cross section with relatively straight walls and flattened tops. Such a structure becomes a sound foundation upon which more layers can be deposited. FIG. 1 shows an example of a slurry being self-supporting over moderate (5 mm) distances while still melding strongly with the prior layers. According to embodiments of the present invention, printing using extrudable pastes of the present invention can be achieved without the use of lasers, vacuums, loose powders, or liquids, which is ideal for microgravity and extraterrestrial applications.

Highly detailed parts can be printed on a variety of surfaces onboard the printer: examples are a planar or flat buildbed, or within a shaped container with smooth or textured sides (e.g. a bowl), or even on a highly-nonplanar mandrel. As used throughout the specification and claims, the term "mandrel" means as a flat, convex or concave surface that has been polished to optical figure accuracy and low surface roughness. A mandrel may comprise any material, including but not limited to glass, silicon, silicon carbide, or metal. Parts can be printed in approximately 10 minutes time, or even less for parts with about 30-60 mm width and less than about 5 mm in depth, rendering a part that "mirrors" or replicates the surface roughness and optical figure accuracy of the mandrel. A 1-meter mirror substrate might be manufactured within 24-hours using the methods of the present invention, dramatically reducing the manufacturing time of these mirrors from months or weeks. After printing, the layered parts are then preferably heated in an oven to dry and cure, for example at about 190° C. for about 20 minutes. Curing temperatures in our process range from approximately 150-250° C. Alternately, in place of an oven, curing may be accomplished via in situ heating with infrared lamps, heating with a laser, or microwaving the parts at low power mode (preferably less than about 500 W) for 30 seconds to several minutes. Curing removes some, but not all, of the organic content of the layered parts prior to subsequent processing. Curing is preferably performed in a controlled manner to avoid cratering created by outgassing. In some embodiments the parts may be partially cured as they are being deposited.

The part in the as-cured state is known as a green body, which is technically now a SiC-reinforced polymer matrix composite (PMC). The PMC green body components preferably have sufficient mechanical integrity for "green body machining" by hand using standard abrasive materials, or via computer numerically controlled (CNS) machines (e.g. sanders, routers, single point diamond turning machines, precision lathes, lapping or wire and sinker electrostatic discharge machining) to improve upon surface roughness and dimensional accuracy if necessary, down to the submicron level (dependent upon the accuracy and ability of the machine).

Individual SiC PMS components can be joined together using additional preceramic polymer with or without solids (such as nanopowders, of either one size or multiple sizes) loading as a "cement". A second curing step physically joins or additively manufactures the individual components as the cement converts to the bulk material. This enables manufacture of a larger, more complex, structure (examples include a truss structure, or a mirror backing structure, or an optical bench, or a deployable structure, or hollow-core kill vehicle structure).

The PMC is preferably subsequently pyrolyzed to densify and convert the material to a SiC/SiC ceramic matrix composite (CMC). When using StarPCS™ SMP-10, wet layups of composite structures, cured prepregs, or cured green bodies can be subsequently pyrolyzed at temperatures from about 650° C. to over 2000° C. to obtain solid SiC yields approaching 67%. Pyrolysis is typically performed in an inert backfilled vacuum furnace. With pyrolysis temperatures of up to about 850° C., an amorphous SiC structure is produced. From temperatures of about 850-1700° C. a beta-SiC crystalline structure results (very good for mirror substrates requiring polishing), and above 1850° C. the alpha-SiC crystalline phase results, ideally for structures that must be hard (e.g. armor, or the external surface components for some hypersonic systems). Pyrolysis preferably results in shrinkage of only about 0.1%-3% for paste systems of the present invention. Some porosity (preferably less than about 3%) can be attributable to the removal of organics from the slurry or paste. Extended time at pyrolysis temperature over 1000° C. results in sintering and/or coarsening of particulates within the material. For pyrolysis temperatures below about 1700° C. the preceramic polymer assumes an ideal nanocrystalline matrix structure for mirror first surfaces. Achieving a fine grained and homogeneous microstructure is preferable to manufacture a polishable facesheet of a mirror. The smaller the grain size, the lower will be the attainable surface roughness of the mirror, enabling replication of the buildbed or mandrel figure accuracy. Pyrolysis is preferably performed in a controlled manner to avoid cratering created by outgassing.

If necessary the CMC article if porous may be densified via a polymer infiltration pyrolysis (PIP) process, which preferably initially utilizes a low percentage by weight of SiC nanoparticles incorporated into a preceramic polymer, which can be the same as the preceramic polymer that was used to build the article or a different one. This process can be called nanoparticle infiltration pyrolysis (NIP). A vacuum is preferably used to assist in drawing the preceramic polymer into the pores of the CMC article. The process is preferably repeated, optionally using a higher percentage by weight of SiC nanoparticles with each iteration, until the density and surface porosity achieved is sufficient for subsequent polishing of the mirror. The weight percent used in each iteration is preferably between about 5% and about 15%. In some embodiments, powders of 30-100 nm in size, and more preferably 40-55 nm in sized, are used for the NIP process. In some embodiments, such as those requiring an optical quality first surface, infiltration may not be performed on that surface, but only on the rest of the article, by not immersing the surface in the PIP or NIP liquid. In order to preserve the lifetime of the vacuum furnace heating elements, initial PIP or NIP cycles may preferably be performed at a lower temperature, for example about 1000° C., while final cycles will preferably be performed at higher temperature, e.g. about 1400-1500° C., to induce formation of a beta-SiC nanostructure. Additionally, blending nanoparticulates of silicon carbide into the PIP or NIP preceramic polymer serves to create nucleation sites for the desired nanostructure, such as nano beta-SiC nanostructure, to form. Thus this nano-slurry is preferably used for each of the iterations of NIP to generate the best nanostructure for polishing. The resulting optical surface preferably has nanometer-scale tolerances. In alternative embodiments, different temperatures and slurries may be used to create a product that comprises alpha-SiC, or a hybrid of alpha-SiC and beta-SiC.

This method of printing can be used to print more than one material at a time; thus, materials can be graded, for example going from a ceramic material to a metal within one part without causing structural damage. This feature may have tremendous value for building in electrodes for the actuators of adaptive optics or active space structures and latching mechanisms, or perhaps even other types of functional electrical pathways. The use of carbon nanotubes (CNTs), whether single walled or multi-walled, and/or graphene nanosheets in the slurry or paste can impart multifunctionality to the CMC, with extreme dimensional stability because of the negative coefficient of thermal expansion and high thermal conductivity of these components. This thermophysical behavior is useful for low Earth orbit (LEO) where space systems pass into and out of sunlight multiple times per day, or for systems which "look" out into the extreme cold (4 Kelvin) of deep space (such as those space systems in Lagrangian orbits). It can also enable discrete placement of a "fugitive" material—material that would evaporate or burn away during the baking process. This is useful for creating a part that has internal structure-cooling channels, or vent holes, for example. With a sufficiently lightweighted FIR telescope it may be possible to incorporate liquid helium for active cooling of the mirrors and structures without compromising the weight budget, enabling thermal control of ultra-stable opto-mechanical systems made using silicon carbide. Furthermore, the same or different preceramic precursors may be used as a bonding agent to connect 3D printed parts into very large structures.

In embodiments of the present invention, only heat (e.g. furnace, microwave, IR, etc.) is required to cure and/or pyrolyze the structure. The paste or slurry does not require any active fillers, such as metal or dielectric particles, for example to couple to microwave radiation, due to the presence of carbon-carbon, silicon-silicon, and silicon-carbon bonds in both the preceramic polymer and the solids for the SiC powders and SiC precursor used in an embodiment of the present invention.

Because structures made in accordance with embodiments of the present invention are 3D printed or additively manufactured, little or no subsequent removal processes (such as lapping, machining, polishing), are necessary.

Figure 2:
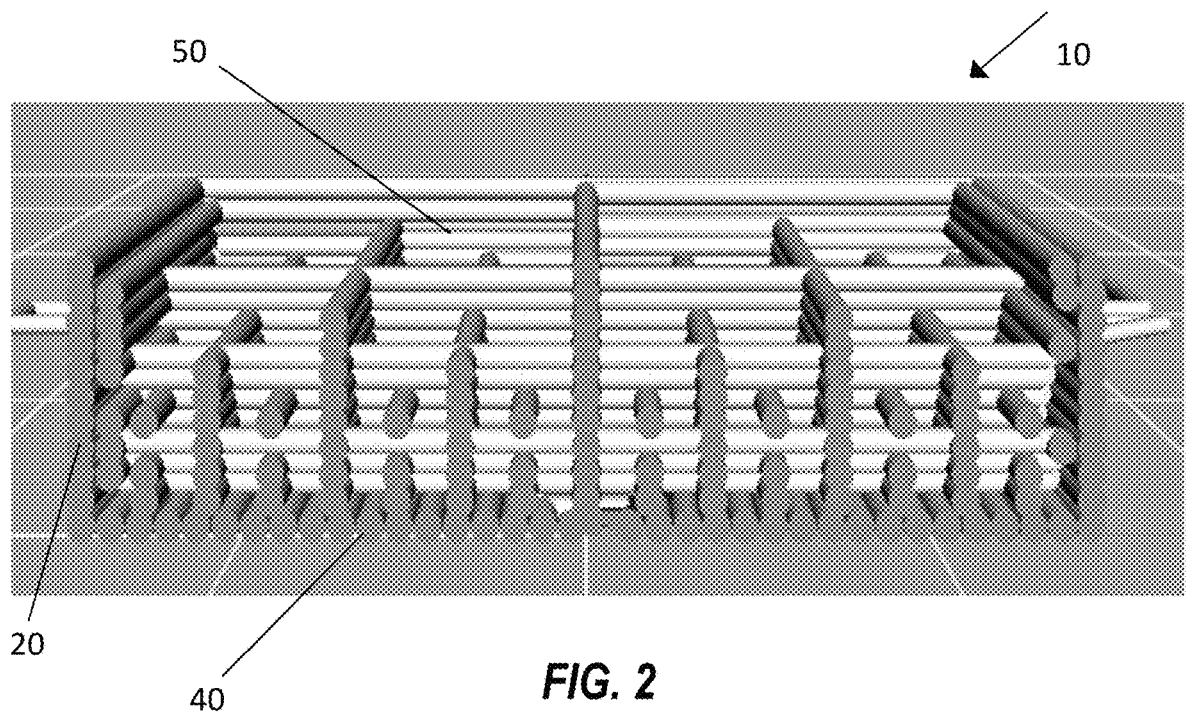
FIG. 2 is a schematic cross sectional side view of a gradient density lattice.
Figure 3:
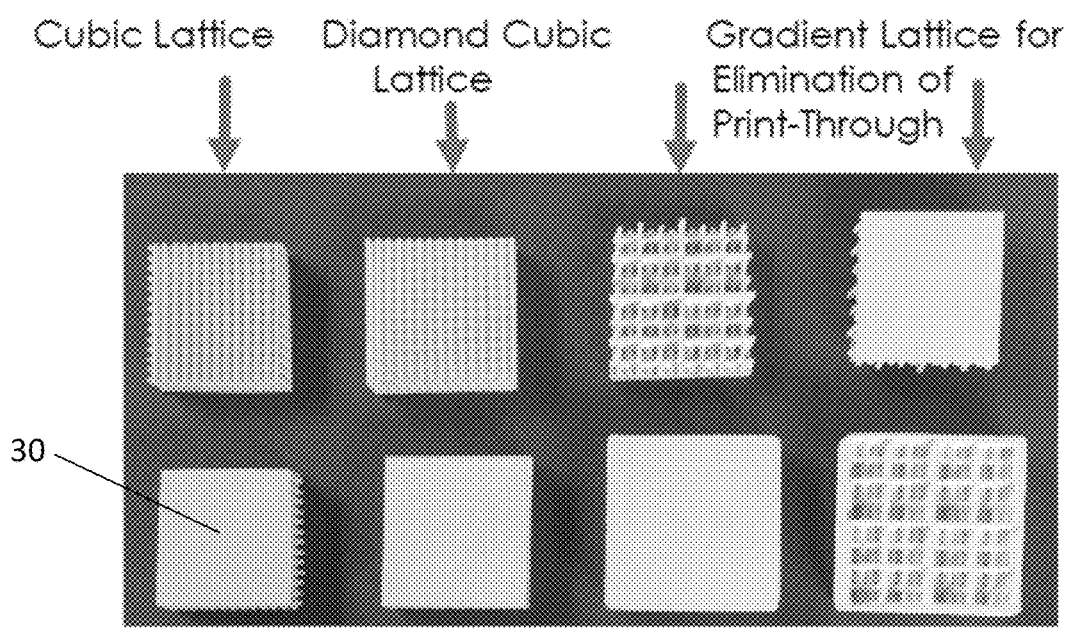
FIG. 3 shows photographs of examples of cubic, diamond cubic, and gradient density lattices.
Figure 4:
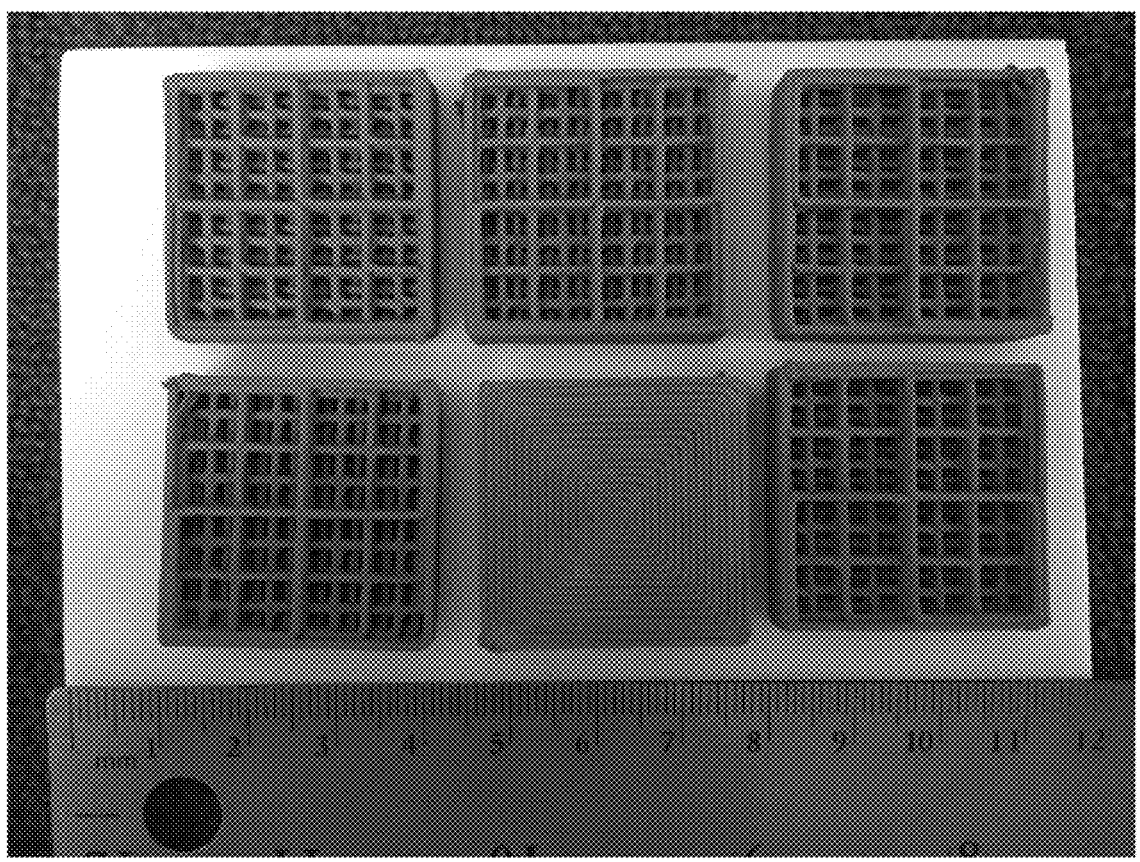
FIG. 4 shows a lightweight gradient density lattice printed using the self-supporting silicon carbide slurry of FIG. 1 in accordance with the present invention.

In an embodiment of the present invention, lattice coupons that comprised a varying density from the bottom surface to the top surface were produced, as shown in FIG. 2. In one experiment, each coupon took about 10 minutes to print. The coupons are preferably in the configuration of lightweighted lattice structures representative of ultra-low areal density optical substrates. The gradient lattice 10 preferably comprises solid sidewalls 20 and optionally a very fine mesh which imparts rigid body support to the solid facesheet 30, which is shown in FIG. 3, and gradually increases cell size through the thickness to minimize overall mass of the part while still providing a stiff rigid body structure. Essentially, there is a grading of the material density from 100% dense on the bottom layer 40 to approximately 27% dense on the top layer 50 over 11 total layers. In one embodiment there were about 100 pores per inch in the densest layer, gradually changing to about four 1 $mm^2$ pores per inch in the top layer. Mirror substrates can be made cylindrical with integral mount tabs, or hexagonal like large aperture mirror segments, or in any other desired shape. As shown in FIG. 3, the lattices can be squares, triangles or hexagons, or even arbitrary and/or irregular shapes, including shapes that could not be made via conventional or computer-controlled material removal machines (i.e. subtractive manufacturing). The backside of the structures may optionally be partially or completely closed for enhanced stiffness of ultralightweight configurations. The sidewalls can be much less than 1 mm in thickness. The partially or fully encapsulated lattice interior also provides damping of vibrations or jitter that may be imparted to the structure during handling, transportation, flight on an airborne vehicle, flight on a launch vehicle, flight on a space vehicle, or during slewing or gimbaling of an optical system. Such vibrations are usually enhanced by deep cryogenic temperatures (4-125 Kelvin, such as may be seen looking into deep space), but the lattice structure has nearly identical damping coefficients at room temperature or deep cryogenic temperature. FIG. 4 shows a number of lightweight gradient density lattices each comprising a facesheet and sidewalls printed using a self-supporting silicon carbide slurry in accordance with the present invention.

For parts made in accordance with the present invention, an achievable areal density for a lightweighted 1.5-meter hexagonal silicon carbide segment may be calculated as follows. Assuming a 1.5-meter circumcircle diagonal hexagonal mirror segment with 1-mm thick facesheets front and back, 1-mm thick sidewalls around the 4.5-meter periphery, a 90% lightweighted lattice core that is 4-mm thick, then the total volume of silicon carbide is 0.003527 $m^3$, for a mass of 11.32 kg, and an areal density of 7.75 $kg/m^2$, which is better than a NASA areal density goal of <15 $kg/m^2$ by a factor of almost 2. The internal lightweighted lattice structure would enable active mirror cooling to liquid helium temperature, if desired. The encapsulated lattice construction of this embodiment provides a uniform coefficient of thermal expansion (CTE) throughout the part for dimensional stability, incredible specific stiffness, and the added benefit of cryo-damping as described above. The process of the present invention also enables direct embedding of electronics for active structures and segments, and the potential for actively cooling with helium for unprecedented low emissivity and thermal control. Finally, the projected cost to produce a mirror using such structures is approximately \$60,000/$m^2$, which is 100 times less expensive than the state-of-the-art beryllium or low expansion glass and glass-ceramic mirrors.

Low cost, lightweight, dimensionally stable mirrors manufactured in accordance with the present invention may be used in complex telescopes for astronomy, imaging and remote sensing applications, including optical instruments/telescopes which enable imaging, surveillance, and reconnaissance missions for police and paramilitary units, fire fighters, power and pipeline monitoring, search and rescue, atmospheric and ocean monitoring, imagery and mapping for resource management, and disaster relief and communications. The dual use nature of complex telescopes will bring affordability to national defense missions such as airborne, shipborne and land-based lasers as well.

Figure 5:
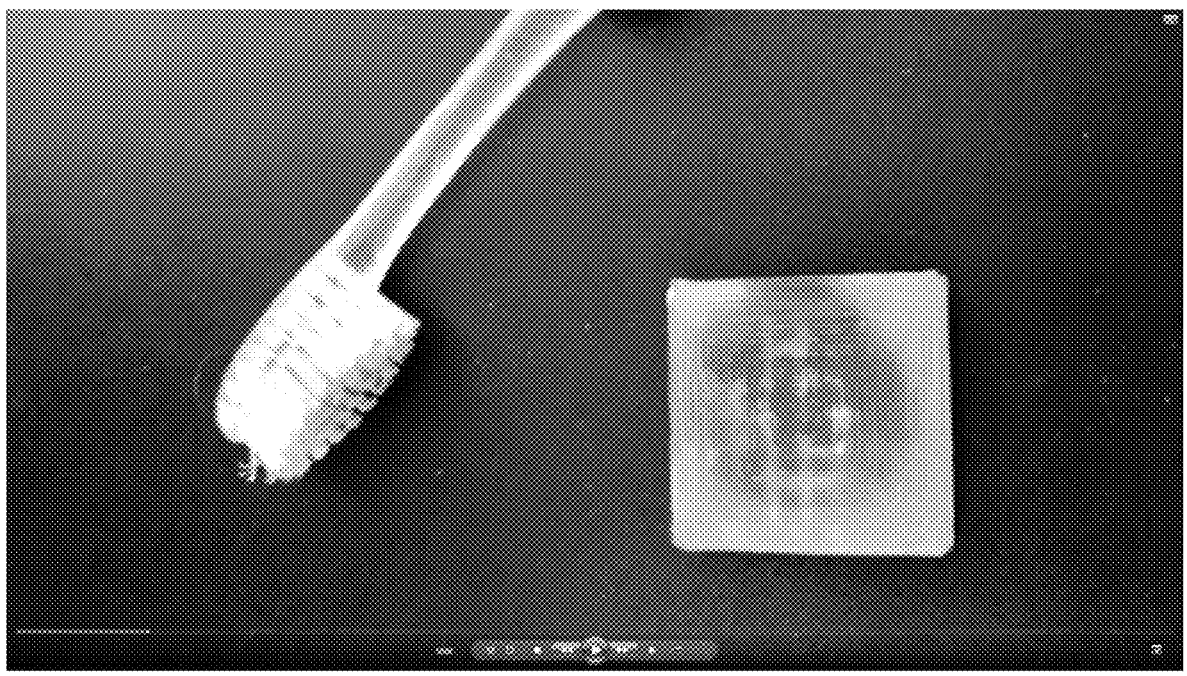
FIG. 5 is a photograph showing a microwave-pyrolyzed component of the present invention.

In some embodiments as-printed or as-cured components can be microwaved for about one minute or more to convert them to ceramic or pyrolyze them. This allows a process analogous to direct laser sintering but using an in-situ microwave instead. This allows freeform building of very large structures that are self-supporting. In some embodiments the components will be fully densified after microwaving; in others, the components may be porous and require NIP to fully densify them. FIG. 5 shows one such component just after microwaving for less than about two minutes.

In other embodiments, the green body may be melt infiltrated with molten Si, preferably in a vacuum furnace. This results in a reaction bonded, two-phase Si—SiC structure. Typically the as-cured 3D printed slurry or nanopaste requires an addition of only about 3 wt % Si, as opposed to the 30% Si typically used in typical commercially available reaction bonded silicon carbide processes.

Replicated Mirror First Surface

An embodiment of the present invention is a replicated first surface of a mirror with a beta-silicon carbide nanocrystalline structure, preferably used as the "build-plate" for subsequent 3D printing or additive manufacturing of a structurally efficient and dimensionally stable lightweight mirror sub-structure (as described above). Once cured the replicant and substructure become a monolithic green body construct (this is an additive manufacturing step). Once pyrolyzed, a ceramic matrix composite with a nanoscale beta-silicon carbide matrix preferably results. The beta-silicon carbide nanocomposite is a structurally efficient, dimensionally stable lightweight mirror that requires little or no cost intensive lapping, polishing or metrology operations, resulting in dramatic cost and schedule savings as compared to the state of the art. This entire process is well suited for autonomous robotic production on the ground, in orbit or on a lunar or Mars or other outer space base.

Hierarchical nanocomposites with multifunctional properties can be made with additions of materials such as carbon nanotubes, carbon fibers, graphene nanosheets (which have a negative coefficient of thermal expansion), tungsten nanoparticles, piezoelectric materials, high-z materials, or magnetostrictive materials to the syrups or pastes described below, or the particulate pastes described above. Additions of continuous or discontinuous carbon fibers with negative coefficient of thermal expansion in the axial direction of the fibers or whiskers can be incorporated to make a quasi-isotropic nanocomposite material with a zero coefficient of thermal expansion. Likewise, additions of carbon nanotubes will produce a nanocomposite with great strength, toughness and electrical conductivity. Additions of piezoelectric or magnetostrictive materials will result in structures that are "active" and shape changing under electrical or magnetic fields, such as deformable mirrors or precision structures for instrumentation requiring optical tolerances on the nanoscale. (Many anticipated NASA technologies require this precision.)

A master mandrel is first preferably figured and finished to at least or better than the optical requirements of the desired replicant first surface of the mirror. As an example, typical visible quality mirrors will have a figure accuracy of lambda/10 Peak-to-Valley over the aperture of the mirror, where lambda is one wavelength of helium neon light (HeNe, 0.632 microns wavelength). The master mandrel is preferably shaped to be the inverse or "mirror image" of the replicated first surface of the mirror so that once the replicant is removed from the mandrel it has the desired mirror optical prescription to within a tolerance that allows for some minor shrinkage during subsequent processing. The shrinkage brings the replicant into the final desired first surface prescription and minimizes or even eliminates the requirement to perform schedule- and cost-intensive lapping and polishing of the mirror surface.

Maintaining the shape of the master mandrel to fractions of the target optical tolerance during the thermal processing (curing) step can be done in at least two ways. In one process, the master mandrel should be made of a material whose coefficient of thermal expansion is nearly zero up from the ambient temperature at which the mandrel is clad with syrup or paste mixture (described below) and up through the cure temperature of the syrup or paste mixture. Candidate materials are ultra-low expansion glass, e.g. ULE®, a Corning product; Zerodur® glass-ceramic, a Schott product; or the quasi-isotropic ceramic matrix composite C/SiC previously described by Goodman et al. in Patent Application Publication No. 2011/0221084, entitled "Honeycomb Composite Silicon Carbide Mirrors and Structures", incorporated herein by reference. In a different process, the master mandrel is preferably chosen so that it expands over the course of the curing temperature cycle such that the syrup or paste is cured at the temperature at which the master mandrel has reached the proper shape (also accounting for minor shrinkage).

It is preferable to use finer nanopowders for production of the mirror first surface so that it will replicate the mandrel or other surface to be replicated. Since fine (e.g. 40-50 nm) nanopowders are expensive, it is possible to use them only for the initial layer, and use less expensive larger powders (e.g. 1-2 microns) for the remainder of the structure, which can be subsequently deposited, or joined together with the initial layer after curing as described above.

EXAMPLES

Two approaches were evaluated to produce the mirror first layer that gets deposited onto the master mandrel:

Example 1: Making a "Syrup" without Surfactant

Figure 6:
FIG. 6 is a photograph showing the viscosity of the syrup example of the present invention.

Mixing, without agglomeration/clumping (apparent to the naked eye), of SiC nanoparticles (NP) into SMP-10 preceramic polymer was performed without the aid of a surfactant or solvent material up to a limit of 22.47% by weight (SiC NP in SMP-10). The resulting mixture has a viscosity like maple syrup, as shown in FIG. 6. The amount of SMP-10 used was 98.33 g, and the amount of SiC NP used was 22.095 g, resulting in a SiC to SMP-10 ratio by weight of 22.47%. The syrup can then be poured into a mold having the desired shape. Curing and pyrolyzing of the "syrup" mix of this example results in acceptable levels of shrinkage (less than 3%) and integrity. In the absence of surfactant, SiC NP additions beyond 22.47 wt % resulted in the onset of agglomeration and/or clumping of the SiC NP in the SMP-10.

Example 2: Making a "Paste" with Surfactant

The use of a surfactant, such as Evonik BREAK-THRU® S-240 surfactant, a non-ionic polyether modified trisiloxane, or other solvent or solvents prevents the agglomeration of nanoparticles in SMP-10, thus enabling the inclusion of a higher percentage of SiC NPs into the preceramic polymer. To improve particulate loading relative to the "syrup" mixture of the previous example, 1-2 wt % of Surf 240 was added to the SMP-10. If agglomeration and/or clumping is observed beyond the "syrup" limitation (i.e. 22.47 wt % SiC NP) then one can gradually increase the Surf 240 percentage until the mixture forms a paste without agglomeration/clumping.

To avoid agglomeration/clumping of SiC NPs into SMP-10 and minimizing the use of Surf 240, sonication of SiC NPs inside Surf 240 may be sonicated prior to their inclusion into SMP-10. Once the "paste" condition is achieved, one can mold, cure and pyrolyze the material in order to study the shrinkage and integrity of the parts.

Curing of the green body was as previously described, and a first pyrolysis can be performed at a relatively low temperature of about 600° C. in order to minimize shrinkage and cracking and maintain the geometric and structural integrity of the part. About 5% by weight of the SiC NPs was mixed into the SMP-10 in order to perform polymer infiltration pyrolysis (PIP) iterations until about 0.5% weight gain convergence was achieved. About 15 wt % of SiC NP into SMP-10 was used for the final PIP iteration to produce a good quality surface finish. Other than the first pyrolysis at 600° C., the remaining pyrolysis steps were preferably performed at a temperature of about 1000-1400° C. to produce a crystalline beta-phase SiC matrix for this new class of ceramic matrix nanocomposites.

In the above examples, 15 nm, 40-55 nm and 100 nm SiC NPs were used, with those 40-55 nm being the most effective for reducing the number of iterations, and being the most cost effective.

Thus the choice and amount of volatiles such as surfactants and/or solvents determines the consistency of the mixture (e.g. syrup vs. paste).

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A method for making a ceramic matrix composite (CMC) article, the method comprising:
    combining a first preceramic polymer with nanoparticles to form a mixture;
    extruding the mixture through a nozzle;
    depositing the mixture on a mandrel;
    curing the mixture to form a green body;
    removing the green body from the mandrel; and
    pyrolyzing the green body to form a CMC article;
    wherein a surface of the CMC article has sufficiently the same surface roughness and figure accuracy of the mandrel to enable the CMC article to be used without polishing.

2. The method of claim 1 wherein the CMC article forms a mirror, lens, edge ring, windshield, or hypersonic leading edge.

3. The method of claim 1 wherein the mixture exhibits pseudoplastic rheology.

4. The method of claim 1 wherein the mixture is a paste or slurry.

5. The method of claim 1 wherein the mixture is self supporting.

6. The method of claim 1 wherein the mixture comprises between approximately 0.5 wt % and 60 wt % of the nanoparticles.

7. The method of claim 1 wherein the mixture comprises between approximately 60 wt % and 95 wt % of the nanoparticles.

8. The method of claim 1 wherein the surface of the CMC article is nanocrystalline.

9. The method of claim 1 further comprising microparticles in the mixture.

10. The method of claim 9 wherein the sizes of the nanoparticles and microparticles are between about 15 nm and about 7 microns.

11. The method of claim 1 wherein the mixture comprises one or more solvents, one or more surfactants, and/or a binder.

12. The method of claim 1 wherein the mixture comprises one or more solvents having a vapor pressure sufficiently low to prevent the mixture from cracking as it dries.

13. The method of claim 1 wherein the curing step is controllably performed to prevent cratering.

14. The method of claim 1 further comprising machining the green body prior to the pyrolyzing step.

15. The method of claim 1 further comprising joining the green body to a second green body by cementing the green body to the second green body using the first preceramic polymer or a different preceramic polymer as a cement prior to the pyrolyzing step.

16. The method of claim 1 wherein the first preceramic polymer is a precursor to SiC, and the nanoparticles comprise SiC.

17. The method of claim 16 wherein the pyrolyzing step is performed from about 800° C. to about 1700° C., thereby producing a CMC article comprising beta-SiC.

18. The method of claim 1 further comprising densifying the CMC article by using polymer infiltration pyrolysis, comprising the steps of:
    infiltrating the CMC article with a second preceramic polymer comprising nanoparticles; and
    pyrolyzing the CMC article.

19. The method of claim 18 wherein the second preceramic polymer is the same as the first preceramic polymer.

20. The method of claim 1 wherein the mixture comprises additional materials selected from the group consisting of powders, nanopowders, carbon nanotubes, carbon fibers, graphene nanosheets, tungsten nanoparticles, piezoelectric materials, high-z materials, and magnetorestrictive materials.

21. The method of claim 1 wherein the curing step comprises microwaving the green body, illuminating the green body with infrared radiation, or heating the green body.

22. The method of claim 1 further comprising:
    depositing additional mixture on the green body;
    curing the deposited mixture and the green body to form a larger green body; and
    repeating the additional deposition and curing steps until a desired green body article is produced.

23. The method of claim 22 wherein the desired green body article comprises a lattice.

24. The method of claim 23 wherein the lattice comprises a density gradient.

25. The method of claim 1 wherein the CMC article changes shape when exposed to an electric or magnetic field.

26. The method of claim 1 wherein the mandrel has a coefficient of thermal expansion of about zero or has a coefficient of thermal expansion chosen so that the mandrel is the desired size at a cure temperature of the mixture.

27. The method of claim 1 wherein the pyrolyzing step comprises microwaving the green body.

28. The method of claim 1 comprising partially curing the mixture during the depositing step.

29. The method of claim 1 performed in orbit, space, or a microgravity environment.

30. The method of claim 1 wherein the CMC article is used in a cryogenically cooled infrared optical system.

31. The method of claim 15 wherein the first preceramic polymer and/or the different preceramic polymer comprises nanoparticles.

* * * * *